(12) United States Patent
McFarland et al.

(10) Patent No.: US 6,314,918 B1
(45) Date of Patent: Nov. 13, 2001

(54) RENEWABLE FUEL GENERATING SYSTEM

(76) Inventors: Steve McFarland, 4101 W. Green Oaks Blvd., #252, Arlington, TX (US) 76016; Wilbur Jones, 6735 Fire Hill Dr., Fort Worth, TX (US) 76137

( * ) Notice: Subject to any disclaimer, the term of this patent is extended or adjusted under 35 U.S.C. 154(b) by 0 days.

(21) Appl. No.: 09/332,361

(22) Filed: Jun. 10, 1999

(51) Int. Cl.$^7$ .................................................. F02B 43/08
(52) U.S. Cl. ........................................................... 123/3
(58) Field of Search ............................... 123/3, DIG. 12; 307/84; 204/242; 322/63, 64, 65, 66, DIG. 2

(56) References Cited

U.S. PATENT DOCUMENTS

| | | | |
|---|---|---|---|
| 3,262,872 | 7/1966 | Rhodes | 204/272 |
| 3,310,483 | 3/1967 | Rhodes | 204/268 |
| 3,543,126 | 11/1970 | Nolan et al. | 320/39 |
| 3,793,544 | 2/1974 | Baumgartner | 320/17 |
| 3,809,996 | 5/1974 | Meisenheimer | 322/28 |
| 3,852,653 | 12/1974 | Kuroda et al. | 320/64 |
| 3,939,806 | 2/1976 | Bradley | 123/3 |
| 3,955,941 | 5/1976 | Houseman et al. | 48/95 |
| 3,980,053 | 9/1976 | Horvath | 123/3 |
| 4,014,777 | 3/1977 | Brown | 204/228.5 |
| 4,045,718 | 8/1977 | Gray | 320/17 |
| 4,081,656 | 3/1978 | Brown | 219/137 |
| 4,088,450 | 5/1978 | Kosaka et al. | 422/201 |
| 4,117,390 | 9/1978 | Iwata et al. | 322/90 |
| 4,156,836 | 5/1979 | Wiley | 320/65 |
| 4,336,485 | 6/1982 | Stroud | 320/15 |
| 4,517,507 | 5/1985 | Nordbrock et al. | 322/28 |
| 4,539,515 | 9/1985 | Morishita et al. | 320/17 |
| 4,604,565 | 8/1986 | Yokota et al. | 320/15 |
| 4,763,610 | 8/1988 | Thomas | 123/3 |
| 4,788,486 | 11/1988 | Mashino et al. | 310/112 |
| 5,159,900 | 11/1992 | Dammann | 123/3 |
| 5,233,229 | 8/1993 | Kohl et al. | 307/10.1 |
| 5,254,936 | 10/1993 | Leaf et al. | 322/90 |
| 5,418,401 | 5/1995 | Kaneyuki | 307/10.1 |
| 5,424,599 | 6/1995 | Stroud | 310/198 |
| 5,444,355 | 8/1995 | Kaneyuki et al. | 322/58 |
| 5,513,600 | 5/1996 | Teves | 123/3 |
| 5,600,232 | 2/1997 | Eavenson, Sr. et al. | 322/12 |
| 5,735,245 | 4/1998 | Kebesh et al. | 123/417 |
| 5,739,676 | 4/1998 | Judge et al. | 322/22 |
| 5,766,438 | 6/1998 | Ishibashi et al. | 204/520 |
| 5,779,866 | 7/1998 | Tarancon | 204/262 |
| 5,833,821 | 11/1998 | Schmid et al. | 204/255 |
| 5,843,292 | 12/1998 | Spiros | 204/258 |
| 5,865,262 | 2/1999 | Ni | 180/54.1 |

*Primary Examiner*—Tony M. Argenbright
*Assistant Examiner*—Hyder Ali

(57) ABSTRACT

This invention operates with a series of components integrally connected to an internal combustion powered engine, wherein an OEM alternator supplies the various fixed voltage load requirements of the engine and its accessories and additionally works in conjunction with a specifically designed high output electrical power generating device to energize a multiple cell anode and cathode type electrolyzer unit for liberating hydrogen gas to fuel said internal combustion powered engine at greater than 100% efficiency levels. Various mechanical and electrical components are incorporated to enhance fuel production, monitor and regulate system efficiency and safety levels, and optimize the performance of this renewable fuel generating system.

2 Claims, 2 Drawing Sheets

RENEWABLE FUEL GENERATING SYSTEM

BACKGROUND—FIELD OF INVENTION

The present invention relates to renewable fuel systems which supply greater than 100% of the fuel requirements for internal combustion powered applications.

BACKGROUND—DESCRIPTION OF PRIOR ART

Various solutions have been set forth to improve the quality of emissions in motor vehicles and other internal combustion powered applications due to environmental concerns, as well as there being a general interest in the technological development of more efficient and more economical energy sources.

Among the methods being employed to achieve these goals are mechanical devices, chemical additives and alternative fuels intended to reduce carbon monoxide, hydrocarbons, sulfur compounds and other noxious emissions. Though there have been some advancements resulting from these efforts, several problems still persist, namely the failure to completely and economically shrink toxic emissions to zero. With the exception of pure hydrogen, there is no known alternative fuel which produces no toxicity in the combustion process.

The use of hydrogen as an alternative fuel in internal combustion engines is both attractive and challenging. Hydrogen is plentiful, non-polluting and renewable. Hydrogen is non-toxic, non-corrosive and when used as a fuel, reverts to harmless water vapor. Conversely, it is laborious to isolate, store and distribute on a large scale.

Chemical extraction, liquefaction and purification of hydrogen on a large scale requires elaborate cryogenics equipment, massive storage facilities and extensive pipeline networks. This method also presents the danger of transporting highly pressurized tanks of the volatile material over roadways and railways. The end user also has the challenge of having to make more frequent fueling stops or to install larger fuel tanks because of the volume of hydrogen gas required per tank to fuel a 200 to 300 mile range.

Though within the scope and capabilities of industry, this method should not be expected to significantly reduce fuel costs to the consumer because of the massive equipment, personnel and distribution channel requirements involved.

The concept of generating hydrogen gas on demand for fuel consumption has the safety and convenience advantages of no need for refueling time, storage tanks or equipment. One method utilized to supply hydrogen gas on demand has been through the use of solar energy panels to electrolyze liquid hydrogen compounds to liberate hydrogen gas. Obviously, this method only works when the sun is shining.

Another method of hydrogen gas production is the electrolysis of hydrogen compounds such as water to liberate hydrogen gas for use as an alternative to fossil fuels. One aspect that makes this method particularly attractive is that it is capable of achieving an ultra pure hydrogen gas. The gas produced by this method is different from liquefied hydrogen gas in that it is a gas of stoichiometric proportions, rendering two parts hydrogen and one part oxygen, which is the optimum mixture needed for combustion.

Upon combustion, the hydrogen and oxygen re-unite to make water vapor, thus completing the renewal cycle to return the elements to their original state. Because of this unique characteristic, the exhaust vapors of the engine can be cooled down and the water condensed and redirected into a holding tank. Almost all of the water can be recovered and re-used indefinitely. The cooled air can also be re-used by recycling it back through the engine fuel intake. These are optional procedures which may not be advantageous for every application, but would most definitely be desirable for some applications.

The practical application of the electrolysis method has previously resulted in many less than satisfactory attempts, primarily due to insufficient hydrogen gas production. Because of the electrical power levels required to liberate the hydrogen gas, this method can only be efficient if an onboard power supply is capable of furnishing ample current for adequate gas production.

Another aspect that has challenged prior art has been inadequate safety measures due to the flammability of hydrogen gas. As with any combustible substance, the safe use of hydrogen gas is a primary concern and reliable safety measures must be included in the effective renewable fuel system for internal combustion engines.

In the current art we will set forth the techniques and benefits for safety generating hydrogen fuel on demand, making it both environmentally preferable and economically attractive. This invention operates with a multiple-cell anode and cathode type hydrogen generator unit, coupled with mechanical and electrical safety controls, an automated liquid level system, and an adapted fuel feed system. It also includes a few modest modifications to the internal combustion engine in order for it to generate the electrical power required to produce greater than 100% of the hydrogen gas necessary to fuel internal combustion powered applications.

It will further include the equipment changes necessary for the safe and efficient utilization of hydrogen gas by the internal combustion engine. These modifications, though not extensive or excessively complicated, are integral and necessary for the proper operation of the engine utilizing this type of fuel system.

Maintenance of the Renewable Fuel Generator System is minimal, requiring only a periodic addition of water, which can also be automated for most stationary applications. Since the systems can be installed and adapted to existing gasoline or alternative fuel type engines, rather than requiring new engine types, the fabrication, distribution, installation, service and repair of the systems can be readily assimilated into the marketplace by current means.

Therefore, for general use as a method of supplying renewable gaseous hydrogen fuel for most internal combustion powered applications, the Renewable Fuel Generating System proves to be extremely advantageous.

OBJECTS AND ADVANTAGES

Accordingly, several objects and advantages of the present invention make it unique and utilitarian. The system provides a continuous, economical and environmentally beneficial fuel supply that is generated onboard the internal combustion powered application, thus eliminating problems relative to hydrogen fuel production, storage, distribution, refueling, toxic exhaust emissions and the depletion of natural resources.

The present invention increases the quality of liberated hydrogen and oxygen gas available for fuel consumption over previous inventions which utilize an onboard electrical power supply. The system provides over 100% of the fuel needed to run an internal combustion powered application, having adequate fuel pressure for the cycling on and off of the electrolyzer unit to allow cooling and to prolong the life of the system components. Higher renewable fuel production from the eletrolyzer is achieved by a high output onboard electrical power generating system. The fuel system is pre-pressurized by an AC power connection, which plugs into normal household current, requiring only a few minutes of time in the event of low fuel pressure before starting the engine. Under normal operation conditions the system maintains adequate fuel pressure for restarting.

The electrical power generating system comprises an OEM alternator, further including a plurality of electrical generating devices. The alternator is connected to a voltage regulator to match the specific voltage output required by the storage battery (or batteries), the engine's ignition system and its accessories. The system also includes at least one specifically designed high output electrical generating device, which is serially connected to the alternator. The electromagnetic field generated by the OEM alternator and the additional electrical circuitry connected to the devices works in conjunction with the power windings of the high output electrical generating device, allowing it to attain much higher output levels than the alternator. The high output electrical generating device, as illustrated in the current art, is thus uniquely dedicated to providing ample current for the electrolyzer unit. The second electrical generating device requires a minimal amount of horsepower from the engine to generate electrical power.

The system further comprises water reservoirs, pumps, liquid level sensing and switching devices, one way flow valves, a fuel line drying device, all carrying fuel and fluids in non-corrosive vessels to maintain the highest purity levels and minimize system parts deterioration. These accessories provide automatic monitoring and servicing of the renewable fuel generator system to provide continuous, long lasting operation of the internal combustion powered application.

A superior level of safety is achieved in the present invention over previous inventions in this field. This is attained by a series of safety switches, flash arresting devices and techniques, strategically applied for the purpose of restricting the flame of the hydrogen fuel within the combustion chamber of the engine. As illustrated herein, in the event of a backfire, safety measures are incorporated throughout the system to instantly extinguish any possible flame. Also, the system's safety level is further enhanced by the absence of hydrogen fuel storage tanks, which further removes the possibility of explosion or rupture in the event of a sudden impact.

Thus, Renewable Fuel Generator Systems, as configured above, afford definite advantages over previous art and other environmentally oriented fuel enhancements, fuel alternatives and pollution control devices by economizing the quantity of equipment, fuel costs and space requirements and by utilizing a renewable, recyclable fuel source which does not pollute and is not consumed in the combustion process.

Still further objects and advantages will become apparent from a consideration of the ensuing description and accompanying drawings.

Conclusions, Ramifications, and Scope

Accordingly, it can be seen that the Renewable Fuel Generating System, as described above, supplies more than adequate hydrogen fuel for an internal combustion powered engine and the normal load requirements of said engine.

Although the description above contains many specificities, these should not be construed as limiting the scope of this invention but as merely providing illustrations of some of the presently preferred embodiments of this invention. Various other embodiments and ramifications are possible within its scope, such as more powerful or less powerful component parts, limiting devices and augmenting devices which may be used to enhance the effects of the present invention.

Thus, the scope of this invention should be determined by the appended claims and their legal equivalents, rather than by the examples given.

Figure 1:
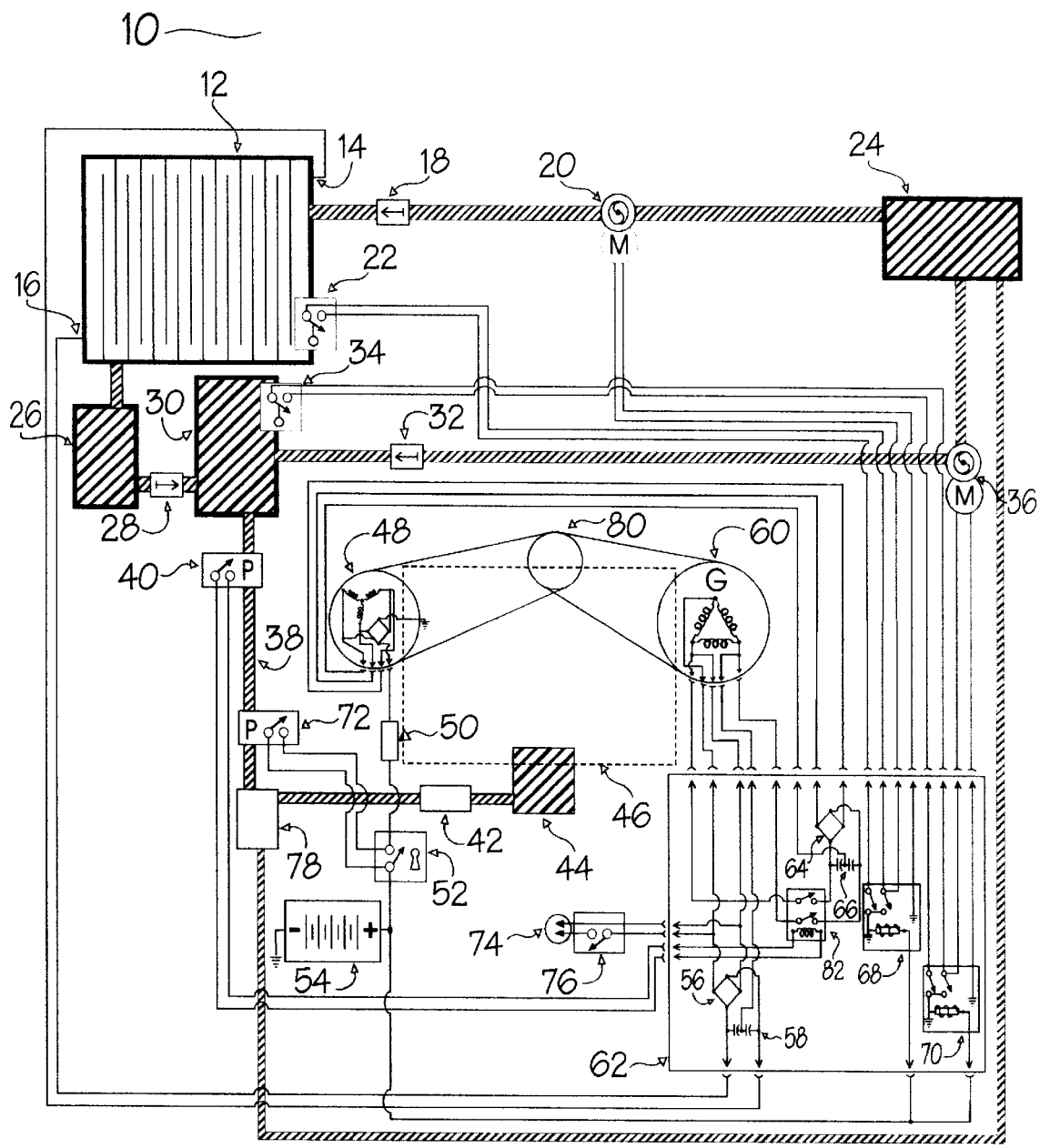
FIG. 1 is a layout of the Renewable Fuel Generating System with an electrical schematic drawing of the components which synergistically function to produce and regulate the renewable hydrogen fuel as it is made ready to be used by the internal combustion powered engine, according to one embodiment of the present invention.

Reference Numerals:
10—Renewable Fuel Generating System
12—Electrolyzer Unit
14—Anode Connection
16—Cathode Connection
18—One Way Flow Valve
20—Electric Pump
22—Liquid Level Switch
24—Water Reservoir
26—Separator Unit
28—One Way Flow Valve
30—Gas Diffuser Unit
32—One Way Flow Valve
34—Liquid Level Switch
36—Electric Pump
38—Fuel Line
40—Pressure Switch
42—Flash Arresting Device
44—Fuel Intake Controller
46—Internal Combustion Powered Engine
48—OEM Alternator
50—Voltage Regulator
52—Ignition Switch
54—Storage Battery
56—Bridge Rectifier
58—Capacitors
60—High Output Electrical Generating Device
62—Electrical Component Schematic
64—Bridge Rectifier
66—Capacitors
68—Latching Relay
70—Latching Relay
72—Pressure Switch
74—AC Power Cord
76—On/Off Controller
78—Fuel Line Dryer Unit
80—Pulley
82—On/Off Controller Preferred Embodiment—Description Referring to FIG. 1, a Renewable Fuel Generator System 10 according to one currently favored embodiment of the present invention will be described. The system includes a multiple cell Electrolyzer Unit 12 with an Anode Connection 14 and a Cathode Connection 16. The liquid level of the Electrolyzer Unit 12 is maintained by a Liquid Level Switch 22 which actuates an Electric Pump 20, transferring water from a Water Reservior 24 through a One Way Flow Valve 18 into the Electrolyzer Unit 12.

The Electrolyzer Unit 12 sends hydrogen gas through the Separator Unit 26, a One Way Flow Valve 28, a Gas Diffuser Unit 30, then through a Fuel Line 38, a Pressure Switch 40 to maintain a specified fuel pressure, a Pressure Switch 72 to kill the engine in an over or under fuel pressure situation, a Fuel Line Dryer Unit 78, a Flash Arresting Device 42, and into the Fuel Intake Controller 44 of the Internal Combustion Powered Engine 46. The liquid level of the Gas Diffuser Unit 30 is maintained by a Liquid Level Switch 34 which actuates an Electric Pump 36, transferring water from a Water Reservoir 24 through a One Way Flow Valve 32 into the Gas Diffuser Unit 30.

Figure 2:
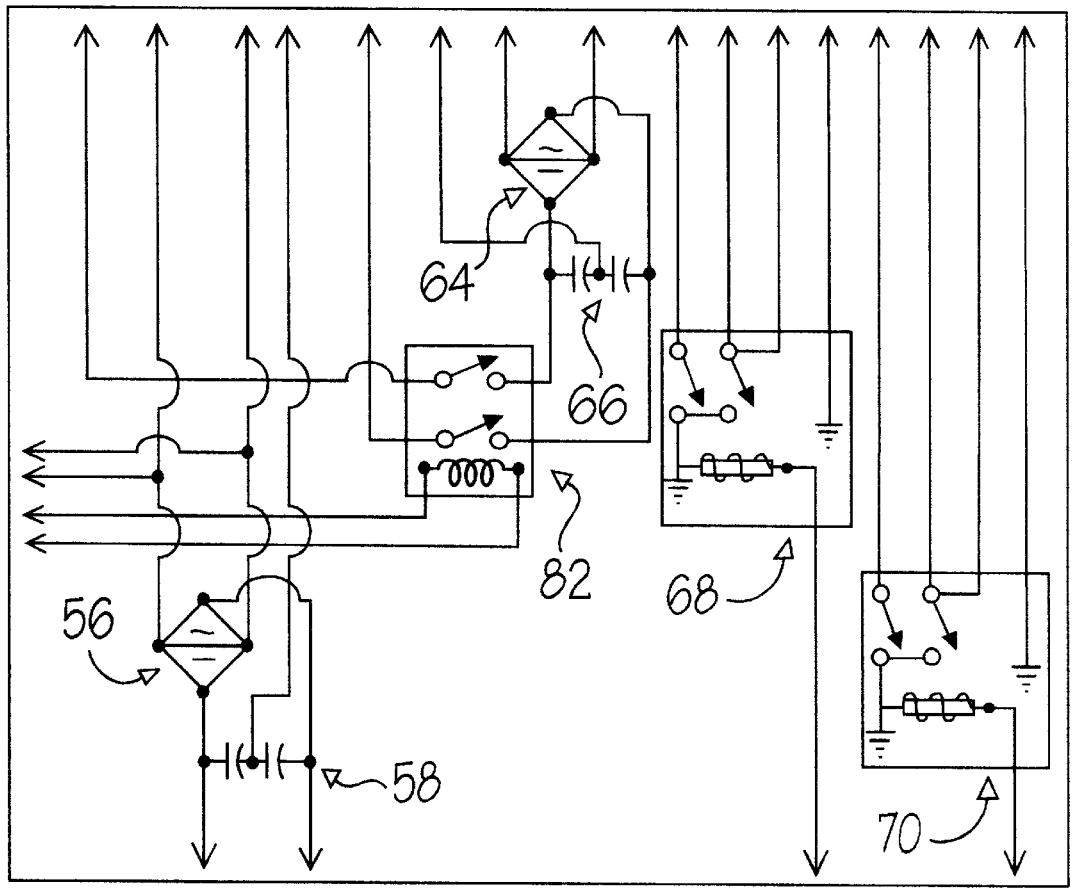
FIG. 2 is an enlarged electrical schematic drawing of the electrical connections, rectifiers, capacitors, relays and switches which are connected to the various electrical components of the renewable fuel generating system.

The Electrolyzer Unit 12 is supplied electrical current through a High Output Electrical Generating Device 60. This is accomplished when the rotations of the engine turn a Pulley 80 which spin the belt-driven OEM Alternator 48 and the belt-driven High Output Electrical Generating Device 60. As they spin, current is discharged from the power windings of the OEM Alternator 48, through a Bridge Rectifier 56, Capacitors 58, and then connecting to the power windings of the High Output Electrical Generating Device 60, through a Bridge Rectifier 64, Capacitors 66, passing through a Pressure Switch 40, and finally to the Anode Connection 14 and the Cathode Connection 16 of the Electrolyzer Unit 12. In the event of low fuel pressure upon starting the engine, an AC Power Cord 74 with an On/Off Controller 76 is included to plug into regular 110–120 VAC household current (or 220–240 VAC, where applicable) to pre-pressurize the fuel system. FIG. 2 displays the Electrical Component Schematic 62 which shows how the various electrical components of the Renewable Fuel Generating System 10 are connected.

The OEM Alternator 48 also supplies specific low voltage current through a standard Voltage Regulator 50, a key operated Ignition Switch 52, a Storage Battery 54 to the low voltage loads of an Internal Combustion Powered Engine 46. Current is also supplied by the OEM Alternator 48 to operate the automated liquid level system, which comprises two Latching Relays 68 and 70, two Liquid Level Switches 22 and 34, and two Electric Pumps 20 and 36.

Preferred Embodiment—Operation

In other embodiments of the present invention, diagnostic devices, meters, valves gauges, indicators, switches, regulators, filters, baffles, surface coatings, heating and cooling systems, exhaust recycling systems, water distillation systems, illuminators, encasements and enclosures, insulating materials and other modifications and variations will no doubt occur to those skilled in the arts to which this invention pertains. Such variations which generally rely on the teachings through which this disclosure has advanced the art are properly considered within the scope of this invention. This disclosure should thus be considered illustrative, not limiting. The scope of this invention is instead defined by the following claims.

What is claimed is:

1. A renewable hydrogen gas fuel generating system for internal combustion powered applications, said system comprising:

a multiple cell anode and cathode type electrolyzer unit wherein hydrogen gas and oxygen gas are liberated from water molecules to provide more than 100% of the fuel required to operate an internal combustion powered engine;

an electrical power generating system wherein a low PRV alternator, connected at having power output windings is circuited through a bridge rectifier and electrolytic capacitors to power windings of a specifically designed high output electrical generating device, which electrical output is circuited through a high PRV high current bridge rectifier and electrolytic capacitors to supply current to an electrolyzer unit for hydrogen gas production;

a renewable fuel supply system wherein the liberated hydrogen gas from said electrolyzer unit is passed through a gas separator unit which allows excess liquid to flow back into the electrolyzer unit while hydrogen gas flows into a gas diffuser unit where it passes through a porous barrier, is dispersed into a water bath and rises to enter a fuel line which passes through a drying unit and a flash arresting device before being fed into a fuel intake controller, then ignited in a combustion chamber of an internal combustion powered engine, which at one reverts to water vapor and is released through said engine's exhaust system.

2. A renewable hydrogen gas fuel generating system for internal combustion powered applications, as recited in claim 1, wherein:

said renewable fuel generating system is supplied with ample current from a high output electrical power generating system to continuously produce greater than 100% of an internal combustion powered engine's fuel requirements, powering a multiple cell anode and cathode type electrolyzer unit which cycles on and off within a specified fuel pressure range by a pressure switch to open and close a circuit from said electrical power generating system;

said electrical power generating system having an OEM alternator which is capable of simultaneously supplying regulated low voltage electrical current for charging a storage battery, an ignition system and accessories, working in conjunction with the power windings of a high output electrical generating device in order to produce a high PRV high amperage necessary to power said electrolyzer unit.

* * * * *